United States Patent
Yano et al.

(10) Patent No.: US 8,711,761 B2
(45) Date of Patent: Apr. 29, 2014

(54) SPREAD SPECTRUM COMMUNICATION SYSTEM AND TRANSMISSION POWER CONTROL METHOD THEREFOR

(75) Inventors: Takashi Yano, Tokorozawa (JP); Nobukazu Doi, Hachioji (JP)

(73) Assignee: FIPA Frohwitter Intellectual Property AG, Gruenwald (DE)

( * ) Notice: Subject to any disclaimer, the term of this patent is extended or adjusted under 35 U.S.C. 154(b) by 895 days.

(21) Appl. No.: 12/081,256

(22) Filed: Apr. 14, 2008

(65) Prior Publication Data

US 2008/0192706 A1  Aug. 14, 2008

Related U.S. Application Data

(63) Continuation of application No. 10/614,796, filed on Jul. 9, 2003, now Pat. No. 7,376,107, which is a continuation of application No. 09/988,137, filed on Nov. 19, 2001, now Pat. No. 6,628,635, which is a continuation of application No. 09/008,589, filed on Jan. 16, 1998, now Pat. No. 6,335,924, which is a continuation of application No. 08/678,656, filed on Jul. 11, 1996, now Pat. No. 5,870,393, which is a continuation of application No. 08/375,679, filed on Jan. 20, 1995, now Pat. No. 5,559,790.

(51) Int. Cl.
   *H04B 7/185* (2006.01)
(52) U.S. Cl.
   USPC .......................................... 370/318; 370/317
(58) Field of Classification Search
   USPC .......................................................... 370/318
   See application file for complete search history.

(56) References Cited

U.S. PATENT DOCUMENTS

| 4,475,010 A | 10/1984 | Huensch et al. ............... 370/334 |
| 4,613,990 A | 9/1986 | Halpern ......................... 455/522 |
| 4,811,421 A | 3/1989 | Havel et al. ..................... 455/69 |
| 4,870,698 A | 9/1989 | Katsuyama et al. .......... 455/522 |
| 5,056,109 A | 10/1991 | Gilhousen et al. |
| 5,093,840 A | 3/1992 | Schilling et al. ............... 375/130 |
| 5,103,459 A | 4/1992 | Gilhousen et al. |

(Continued)

FOREIGN PATENT DOCUMENTS

| JP | 61502576 | 11/1986 |
| JP | 4502841 | 5/1992 |

(Continued)

OTHER PUBLICATIONS

S. Salmasi, K.S. Gilhousen "On the System Design Aspects of Code Division Multiple Acces: (DCMA) Applied to Digital Cellular and Personal Communications Network", IEEE VTS 1991, 57-62.

(Continued)

*Primary Examiner* — Shripal Khajuria
(74) *Attorney, Agent, or Firm* — Mattingly & Malur, PC

(57) ABSTRACT

In a spread spectrum communication system, one ($W_n$) of a series of orthogonal codes for spectrum spreading is assigned to signal-to-noise ratio measurement in a terminal. On the basis of a noise signal detected by de-spreading a signal received from an antenna with the above described orthogonal code ($W_n$) and a pilot signal, each terminal derives a signal-to-noise ratio. Each terminal transmits the signal-to-noise ratio to the base station as a power control signal. On the basis of signal-to-noise information received from each terminal as the power control signal, the base station controls signal transmission power for each terminal.

7 Claims, 12 Drawing Sheets

(56) References Cited

U.S. PATENT DOCUMENTS

| | | | |
|---|---|---|---|
| 5,107,487 A | 4/1992 | Vilmur et al. | 370/342 |
| 5,199,045 A | 3/1993 | Kato | 455/88 |
| 5,241,690 A | 8/1993 | Larsson et al. | |
| 5,265,119 A | 11/1993 | Gilhousen et al. | 455/69 |
| 5,297,161 A | 3/1994 | Ling | 455/69 |
| 5,335,249 A | 8/1994 | Krueger et al. | 455/69 |
| 5,345,598 A | 9/1994 | Dent | 455/54.1 |
| 5,386,588 A | 1/1995 | Yasuda | 455/423 |
| 5,396,649 A | 3/1995 | Hambe | |
| 5,485,486 A | 1/1996 | Gilhousen et al. | 370/335 |
| 5,487,180 A | 1/1996 | Ohtake | |
| 5,548,812 A | 8/1996 | Padovani et al. | 370/332 |
| 5,551,057 A | 8/1996 | Mitra | 70/391 |
| 5,559,790 A | 9/1996 | Yano | |
| 5,574,747 A | 11/1996 | Lomp | 375/200 |
| 5,574,984 A | 11/1996 | Reed et al. | |
| 5,603,096 A | 2/1997 | Gilhousen et al. | 455/69 |
| 5,604,730 A | 2/1997 | Tiedemann, Jr. | 370/252 |
| 5,621,723 A | 4/1997 | Walton, Jr. et al. | 375/200 |
| 5,631,921 A | 5/1997 | Schilling | 375/200 |
| 5,640,414 A | 6/1997 | Blakeney, II et al. | 375/200 |
| 5,648,955 A | 7/1997 | Jensen et al. | 370/252 |
| 5,715,236 A | 2/1998 | Gilhousen et al. | 370/209 |
| 5,822,318 A | 10/1998 | Tiedemann, Jr. et al. | 370/391 |
| 5,870,393 A | 2/1999 | Yano et al. | 370/335 |
| 6,335,924 B1 | 1/2002 | Yano et al. | |
| 6,628,635 B2 | 9/2003 | Yano et al. | |
| 2002/0187784 A1* | 12/2002 | Tigerstedt et al. | 455/439 |

FOREIGN PATENT DOCUMENTS

| | | |
|---|---|---|
| JP | 4233334 | 8/1992 |
| JP | 575484 | 3/1993 |
| JP | 5110504 | 4/1993 |
| WO | 9200639 | 1/1992 |

OTHER PUBLICATIONS

"Hybrid CDMA System using Microcells and Macrocells", by Nobukazu Doi, et al., PIMRC '9: pp. 518-521. 2001.

"Proposed EIA/TIA Interim Standard: Wideband Spread Spectrum Digital Cellular System Dual-mode Mobile Station-base Station Compatibility Standard", Technical Report 80-7814 Rev DCR 03567, Qualcomm Inc., Apr. 1992, p. 9, Sec. 6, p. 240 and Sec. 7, p. 182.

Anderson, Tuning the Macro Diversity Performance in a DS-CDMA System; Vehicular Technology Conference, IEEE, pp. 41-45, 1994.

K. Gilhousen, et al "On the Capacity of a Cellular CDMA System", IEEE Transactions On Vehicular Technology, vol. 40, No. 2, May 1991, pp. 303-312.

* cited by examiner

SPREAD SPECTRUM COMMUNICATION SYSTEM AND TRANSMISSION POWER CONTROL METHOD THEREFOR

The present application is a continuation of application Ser. No. 10/614,796, filed Jul. 9, 2003 (now U.S. Pat. No. 7,376, 107); which is a continuation of application Ser. No. 09/988, 137, filed Nov. 19, 2001, now U.S. Pat. No. 6,628,635; which is a continuation of application Ser. No. 09/008,589, filed Jan. 16, 1998, now U.S. Pat. No. 6,335,924; which is a continuation of application Ser. No. 08/678,656, filed Jul. 11, 1996, now U.S. Pat. No. 5,870,393; which is a continuation of application Ser. No. 08/375,679, filed Jan. 20, 1995, now U.S. Pat. No. 5,559,790, the contents of which are incorporated herein by reference.

BACKGROUND OF THE INVENTION

The present invention relates to a spread spectrum communication system, and in particular to a spread spectrum cellular system in which a plurality of terminals simultaneously communicate with a base station, and mobile terminals and a transmission power control method applied to the spread spectrum cellular system.

FIG. 9 shows an example of a conventional spread spectrum cellular system. A plurality of base stations 100 (100-a, 100-b) connected to a switching unit 10 are distributed to form a plurality of cells 1 (1a, 1b). In each cell, a plurality of mobile terminals 300 (300-1, 300-2; 300-j, 300-k) communicate with a base station 100. There has been know a method of using orthogonal codes Wi unique to respective terminals as spreading codes signals transmitted from each base station 100 to each of terminals included in a cell in such a spread spectrum cellular system.

As represented by codes W0, W1, W2 and W3 shown in FIG. 10, for example, orthogonal codes have such a property that the inner product performed on two arbitrary codes included in the codes W0, W1, W2 and W3 over an orthogonal code span becomes "0."

Therefore, the base station assigns orthogonal codes Wi (i=1, 2, ..., n) respectively unique in a cell to a plurality of terminals 300-1 through 300-n located in the cell, and spreads a signal or data addressed to one terminal 300-i by using an orthogonal code Wi unique to that terminal 300-i. The above described terminal 300-i de-spreads a signal received from an antenna by using the orthogonal code Wi assigned to itself. By doing so, transmitted signals addressed to other terminals located in the cell which are orthogonal to the transmitted signal addressed to the terminal 300-i are completely removed in the process of the above described de-spreading process and hence they do not act as interference.

A communication method thus employing spreading with orthogonal codes for communication from each base station to mobile terminals is described in U.S. Pat. No. 5,103,459, for example.

In a spread spectrum cellular system using orthogonal codes, however, signals transmitted from other base stations forming adjacent cells arrive at each terminal besides the signal transmitted from the base station. In this case, signals transmitted from other base stations are not orthogonal to the signal transmitted from the base station in the cell, and hence they cannot be removed in the above described cell by de-spreading process using the unique orthogonal code Wi. That is to say, in receiving operation of each terminal, signals transmitted from base stations of adjacent cells act as an interference cause (noise).

FIG. 11 is a diagram showing the influence of the above described signals transmitted from other base stations and received by each terminal.

Received power of the signal transmitted from the base station is attenuated as the distance from the base station is increased. In a terminal, such as 300j, located near the base station and located near the center of the cell, therefore, received power 910 of the signal from the base station in the cell is large whereas received power 911 of the signal coming from other base stations located outside the cell and functioning as interference becomes small. As a result, a high signal-to-noise ratio is obtained. In a terminal, such as 300k, located near the boundary of the cell, received power 912 of the signal from the base station located in the cell is weak whereas interference from adjacent cells is received with power 913 larger than that of the above described terminal 300j. As a result, the signal-to-noise ratio is degraded.

For the above described reason, it is desired to control transmission power in the cellular system according to the positional relation with respect to a terminal so that a signal to be transmitted from each base station to a terminal may be outputted with small transmission power for the terminal 300j located near the center of the cell and with large transmission power for the terminal 300k located on the periphery of the cell.

Such a transmission power control method as to change the transmission power according to the terminal position is described in "On the System Design Aspects of Code Division Multiple Access (CDMA) Applied to Digital Cellular and Personal communications Network," by A. Salmasi and K. S. Gilhousen, IEEE VTS 1991, pp. 57-62, for example.

According to the control method described in the aforementioned paper, each terminal measures the signal-to-noise ratio of a received signal by using a circuit configuration shown in FIG. 12, for example, and transmits a power control signal demanding adjustment of transmission power to the base station. By using circuit configurations shown in FIGS. 13 and 14, the base station conducts transmission signal power control operation in response to the above described power control signal.

FIG. 12 shows the configuration of a transmitter and receiver circuit of a conventional terminal.

A signal received by an antenna 301 is inputted to a radio frequency circuit 303 via a circulator 302 and converted therein to a base band spread spectrum signal.

The above described base band spread spectrum signal is inputted to a first multiplier 304, therein multiplied by pseudo-noise PN generated by a pseudo-noise generator 305, and subjected to a first stage of de-spreading process. The above described pseudo-noise PN has a noise pattern set so that the pseudo-noise PN may become the same as a unique pseudo-noise PN generated by a PN generator 103 of the above described base station when the position of the terminal is registered in the base station.

The signal subjected to the first stage of de-spreading process is inputted to a second multiplier 307, therein multiplied by an orthogonal code Wi generated by an orthogonal code generator 306 and assigned to the terminal, and subjected to a second stage of de-spreading process.

The signal subjected to the second-stage of de-spreading process is inputted to an accumulator 308. The signal received during a predetermined time is accumulated by the accumulator 308. The accumulated signal is decoded by a decoder 309 to form received data.

Conventionally in each terminal, the signal-to-noise ratio of the received signal is measured by utilizing the fact that the variance of probability density distribution relating to the amplitude of the received signal indicates the noise power and its average indicates the amplitude of signal. For the purpose of this measurement of the signal-to-noise ratio, the output of the accumulator 308 is inputted to an absolute value unit 328 and a square unit 325. The absolute value of the received signal obtained by the absolute value unit 328 and the square value obtained by the square unit 325 are supplied to a signal-to-noise (SIN) ratio measuring unit 329.

In the signal-to-noise ratio measuring unit 329, the signal-to-noise ratio is measured by deriving noise power from the difference between the average value of squared value input and the squared value of the average of the absolute value input and deriving signal power from the squared value of the average of the absolute value input. In a comparator 330, the measured signal-to-noise ratio is compared with a reference signal-to-noise ratio value. From the comparator 330, a power control signal PC-i for requesting the base station to increase or decrease the transmission power is outputted.

The power control signal PC-i is multiplexed in a multiplexer 317 with a data signal to be transmitted from the terminal and subjected to encoding process for error correction in an encoder 318. In a multiplier 320, the encoded signal is multiplied by pseudo-noise generated by a pseudo-noise generator 319 and thereby subjected to spread spectrum modulation. The signal subjected to spread spectrum modulation is converted in a radio frequency circuit 321 to a signal in the transmission frequency band, then supplied to the antenna 301 via the circulator 302, and emitted in the air.

FIG. 13 shows the configuration of a transmitter and receiver circuit of a base station.

Signals from supplied respective terminals and received by an antenna 110 are inputted to a radio frequency circuit 111 via a circulator 109 and converted therein to base band spread spectrum signals Rx.

The base band spread spectrum signals Rx are inputted to a plurality of modems 105-1, 105-2, . . . 105-N respectively associated with terminals located in the cell. As a result of de-spreading process and decoding process executed in these modems, transmitted signals (received data) 112 of respective terminals are separated from power control signals PC multiplexed with the transmitted signals and transmitted by respective terminals.

The power control signals PC outputted from respective modems 105-$i$ (i=1, 2, . . . , N) are inputted to a transmission power controller 116. In response to respective power control signals PC, the transmission power controller 116 generates transmission power specifying signals PW associated with respective terminals.

To transmission data 101 to be transmitted from the base station to each terminal, the modem 105-$i$ (i=1, 2, . . . , N) applies encoding process and spread spectrum modulation process using pseudo-noise PN unique to the base station generated by a pseudo-noise (PN) generator 103 and an orthogonal code (W1, W2, W3, or W.sub.N) generated by an orthogonal code generator 102.

The signal modulated by spectrum spreading is amplified with transmission power depending upon the signal PWi for specifying transmission power associated with each terminal and outputted from the transmission power controller 116, and outputted as transmission signal Tx-i (i=1, 2, . . . , N).

Numeral 104 denotes a pilot signal generator for generating simple pattern data such as all zero data. This pilot signal is subjected to spread spectrum modulation by using pseudo-noise PN unique to the base station generated by the pseudo-noise generator 103 and a specific orthogonal code W.sub.0 generated by the orthogonal code generator 102, and thereafter outputted as a pilot signal. Each terminal senses a cell boundary on the basis of a change of the pilot signal caused by movement of the terminal and changes over from one base station to another base station between two adjacent cells.

Transmission signals Tx-i (i=1, 2, . . . , N) addressed to respective terminals are successively added by cascade adders 107 (107-0, 107-1, . . . ), thereafter converted to signals in the transmission frequency band together with the pilot signal by a radio frequency circuit 108, and emitted in the air via the circulator 109 and the antenna 110.

FIG. 14 shows an example of configuration of the modem 105-$i$ (i=1, 2, . . . , N) illustrated in FIG. 13.

Transmission data 101 inputted to the modem 105-$i$ is inputted to an encoder 201 and subjected therein to encoding process for error correction. The encoded signal is multiplied in a multiplier 202 by an orthogonal code Wi and thus subjected to a first stage of spectrum spreading. The output of the multiplier 202 is multiplied in a multiplier 203 by a pseudo-noise signal PN and thus subjected to a second stage of spectrum spreading. The signal thus subjected to spectrum spreading is inputted to a variable gain amplifier 204, amplified therein with a gain specified by the transmission power specifying signal PW-i, and outputted as a transmission signal Tx-i.

On the other hand, the received signal Rx inputted to the modem 105-$i$ is inputted to a multiplier 205, and subjected therein to de-spreading process using pseudo-noise PN generated by a pseudo-noise generator 206 which is identical with pseudo-noise PN used for spectrum spreading in the terminal wherefrom the signal Rx is transmitted. The de-spreaded signal is inputted to an accumulator 207 and the signal over a predetermined time is accumulated.

This accumulated de-spreaded signal is inputted to a decoder 208, therein subjected to decoding process for error correction, split into decoded received data 112 and the power control signal PC-i transmitted by the terminal, and outputted as the received data 112 and the power control signal PC-i.

By the configuration heretofore described, each terminal informs the base station of reception signal-to-noise ratio of a signal transmitted from the base station to its own terminal, and the base station controls the transmission power so as to make the reception signal-to-noise ratio of each terminal equivalent to a desired signal-to-noise ratio.

In the above described conventional spread spectrum communication system, each terminal measures the signal-to-noise ratio on the basis of only a signal transmitted by the base station and addressed to itself. That is to say, the signal-to-noise ratio is measured by regarding variance of amplitude of the received obtained by de-spreading as noise power and regarding square of average amplitude as signal power.

However, the principle of the above described conventional signal-to-noise ratio measurement is premised on the fact that the signal amplitude becomes constant in case there is no noise. In a mobile communication system, however, the amplitude of the received signal of each terminal varies violently as the terminal moves. For obtaining a reliable result of signal-to-noise ratio measurement in each terminal, therefore, the measurement must be completed in such a comparatively short period of time that the amplitude of the received signal can be regarded as approximately constant.

In the conventional terminal, therefore, circuits having extremely high speed performance are demanded for the signal-to-noise ratio measurement circuits 325-329. If it takes time to measure the signal-to-noise ratio from restrictions of circuit performance, correct measurement results of the signal-to-noise ratio are not obtained. This results in a problem that the base station cannot implement suitable power control on the basis of the power control signal supplied from the terminal.

If in this case the base station transmits signals to respective terminals with more power than they need by taking the error component of the measurement result of the signal-to-noise ratio into consideration, then the transmitted signals invade adjacent cells with high power and function as strong interference signals to terminals located in adjacent cells. On the other hand, if the base station transmits a signal with smaller power than the terminals actually need, the communication quality in the terminal which has received the signal is degraded, resulting in a problem.

As for the power control method of a signal transmitted from the base station, the following method can be considered. According to this method, each terminal monitors the error rate of received data instead of the signal-to-noise ratio of the above described received signal, and in case the error rate does not satisfy a predetermined criterion, the terminal requests the base station to increase the transmission power. However, this method has a problem that monitoring over a comparatively large time is needed to calculate the error rate of data and hence power control cannot sufficiently follow changes of the communication condition.

SUMMARY OF THE INVENTION

An object of the present invention is to provide a spread spectrum communication system and a power control method whereby each terminal can communicate with the base station with a high signal-to-noise ratio.

Another object of the present invention is to provide a spread spectrum communication system and a power control method whereby the number of possible active channels can be increased in each cell.

Another object of the present invention is to provide a mobile terminal capable of rapidly calculating control information for power control to be transmitted to the base station.

In order to achieve the above described objects, in a spread spectrum communication system according to the present invention, the base station assigns at least one orthogonal code included in an orthogonal code sequence for spectrum spreading as "orthogonal code W.sub.N for control (for measuring noise)" which is not applied to modulation of the pilot signal and transmission signals addressed to each terminal.

Furthermore, in accordance with present invention, the signal-to-noise ratio of a received signal is derived on the basis of received power of the noise signal obtained by de-spreading the signal received from an antenna with the orthogonal code W.sub.N assigned to noise measurement and received power of a pilot signal obtained by de-spreading with the orthogonal code W.sub.0.

In a spread spectrum communication system according to the present invention, each terminal transmits power control information depending upon the value of the above described signal-to-noise ratio to the base station, and the base station controls transmission power of a transmission signal (a data signal) for each terminal according to the power control information received from the terminal.

All signals transmitted from one base station are orthogonal to the orthogonal code used exclusively for control. If in each terminal as described above the signal received from the antenna is de-spreaded by using the orthogonal code W.sub.N for control which is not applied to modulation of signals transmitted from the base station, it is possible to completely remove the signal of each channel transmitted from the base station located in the cell from the received signal.

In this case, a signal transmitted from a base station of another cell and received from the antenna is not orthogonal to the above described orthogonal code W.sub.N for control, and hence it is not removed by the above described de-spreading process but remains as a noise signal. By deriving average of square of noise signal N extracted by de-spreading process of the antenna receiving signal using the above described orthogonal code W.sub.N for control, therefore, noise power can be measured rapidly and with a sufficient precision.

On the other hand, the value of the signal S supplied from the base station is obtained by de-spreading the antenna receiving signal with the orthogonal code W.sub.0 assigned to the pilot signal. From the power value thereof and the above described noise power, the signal-to-noise ratio value can be derived. The pilot signal is not subject to power control unlike the data signal addressed to each terminal. As compared with the signal-to-noise ratio derived by detecting the signal of a data channel varied by power control, therefore, a stable signal-to-noise ratio can be obtained.

According to the present invention, each terminal informs the base station of the power control request depending upon the signal-to-noise ratio value and the base station controls the signal transmission power of each terminal on the basis of the control request made by each terminal. Thereby, communication quality of each terminal can be assured.

If the control of signal transmission power is exercised so as to make the signal-to-noise ratio equivalent in all terminals, the total transmission power of each base station can be decreased. As a result, therefore, the value of noise power exerting a bad influence upon adjacent cells can be decreased. Thereby, the signal-to-noise ratio in each terminal can be advantageously further improved.

The foregoing and other objects, advantages, manner of operation and novel features of the present invention will be understood from the following detailed description when read in conjunction with the accompanying drawings.

DESCRIPTION OF THE PREFERRED EMBODIMENTS

Figure 1:
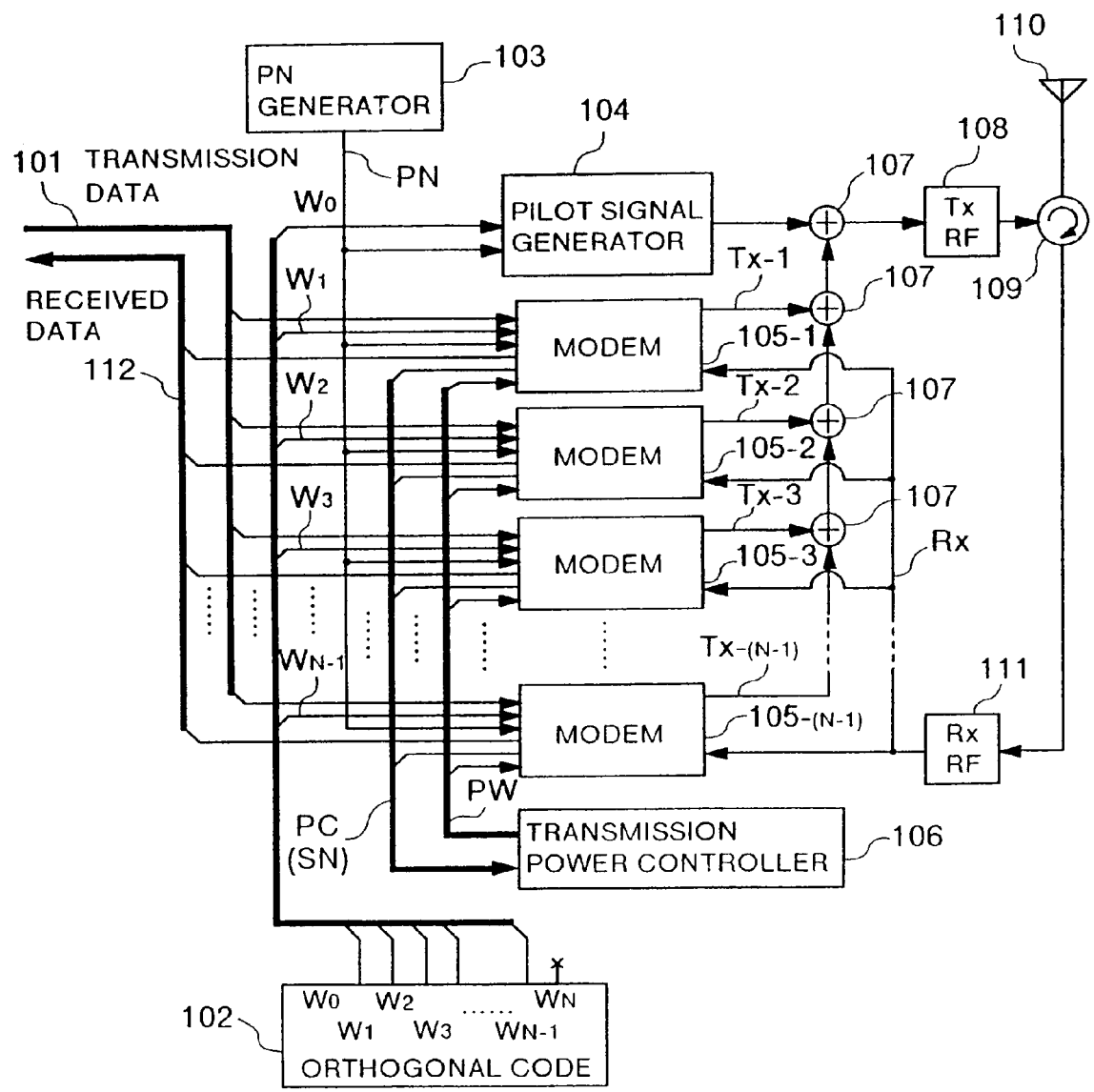
FIG. 1 is a diagram showing an example of configuration of a base station in a communication system according to the present invention.
Figure 14:
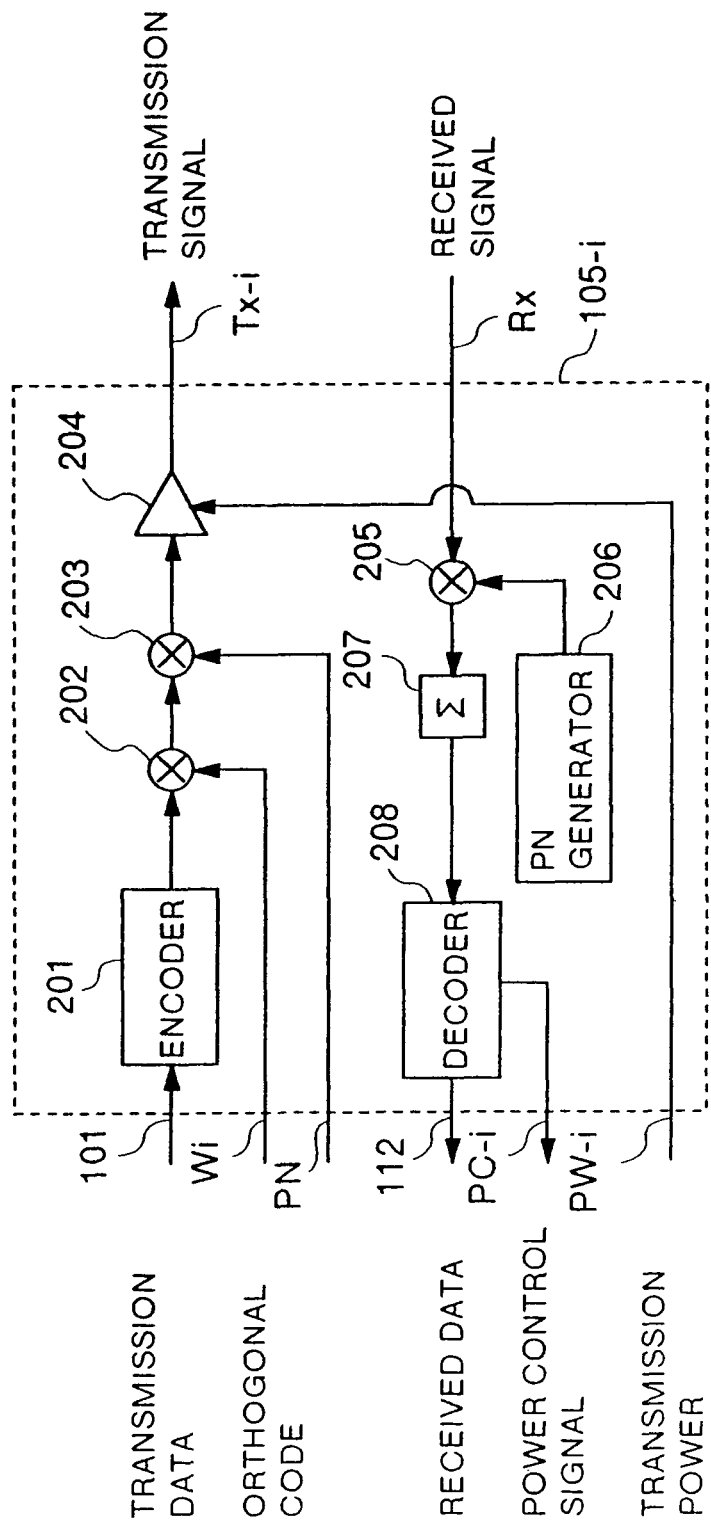
FIG. 14 is a diagram showing an example of a modem of a base station according to a conventional technique.

FIG. 1 shows an example of configuration of a base station in a spread spectrum communication system according to the present invention. In FIG. 1, the same components as those of the base station described by referring to FIG. 14 are denoted by like characters.

In the communication system according to the present invention, operation of a base station 100 is nearly the same as that of the base station in the conventional technique described before, but differs in that arbitrary one ($W_N$ in this embodiment) out of orthogonal codes outputted from an orthogonal code generator 102 is excluded from application of modulation of data to be transmitted to terminals and assigned to exclusive use for the signal-to-noise ratio measurement.

Figure 2:
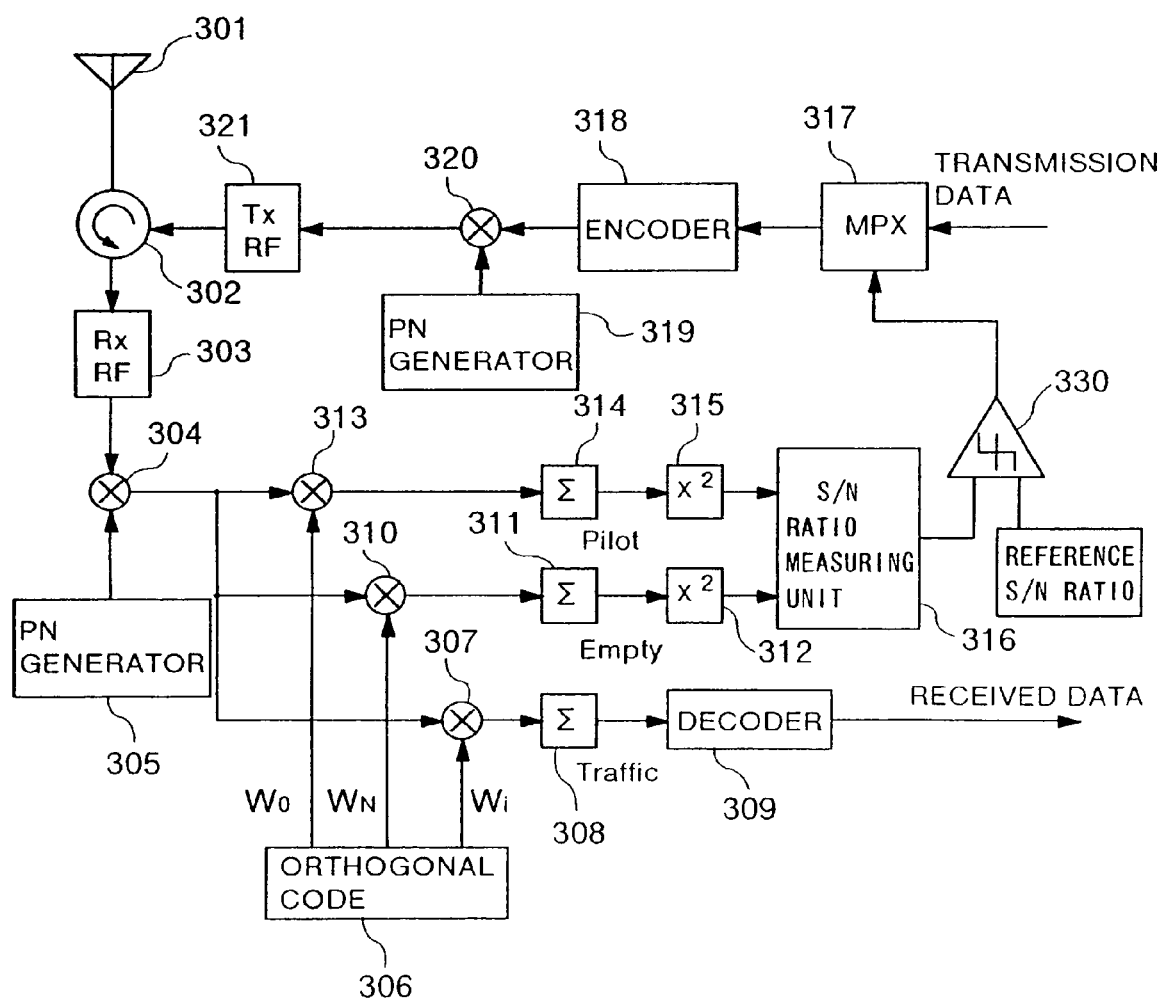
FIG. 2 is a configuration diagram showing a first embodiment of a terminal applied to the communication system of the present invention.

FIG. 2 shows a first embodiment of a terminal according to the present invention.

Figure 13:
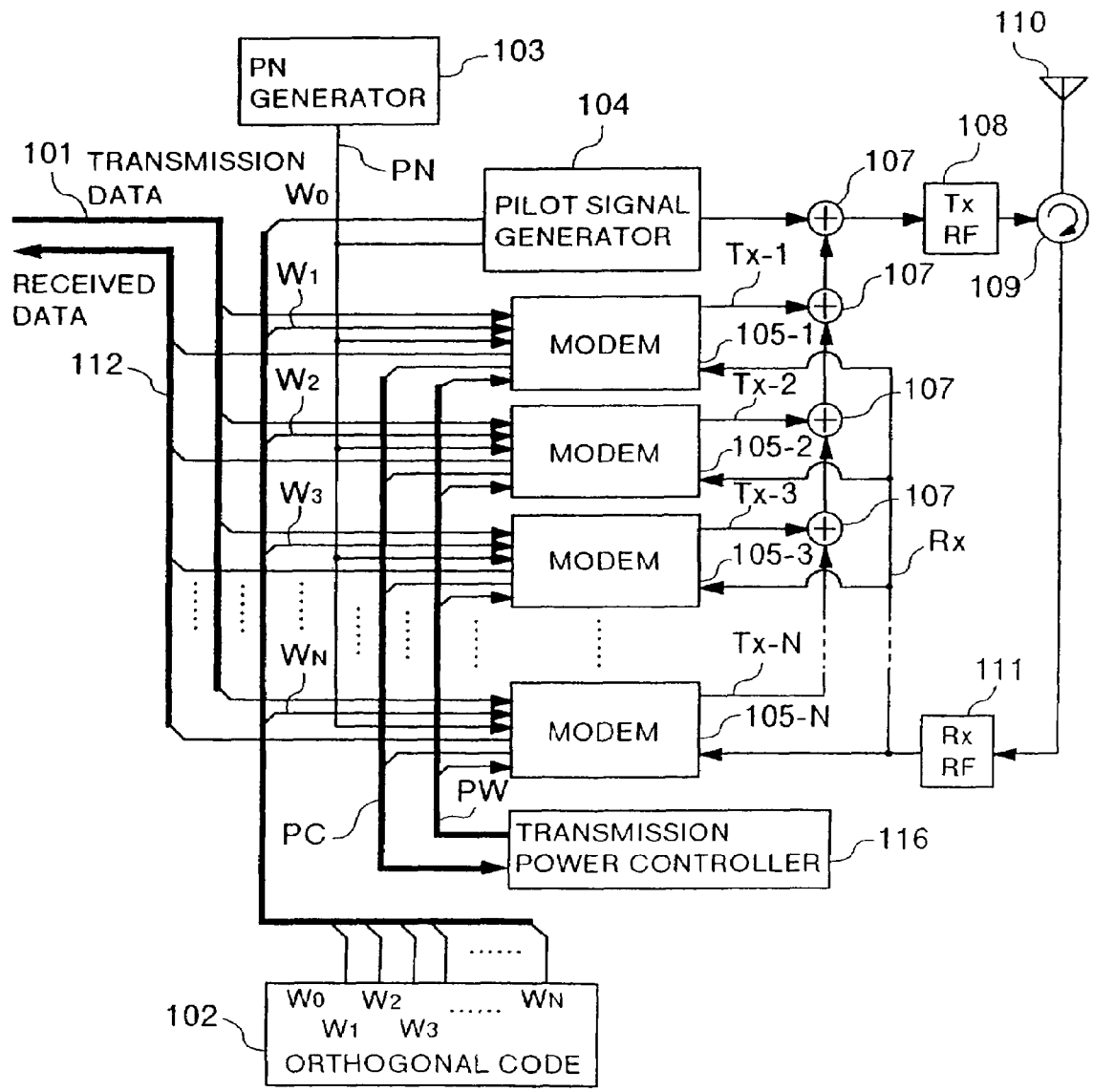
FIG. 13 is a diagram showing the configuration of a base station according to a conventional technique.

In FIG. 2, circuit components 301 through 309 correspond to the circuit components 301 through 309 of the conventional terminal shown in FIG. 13. In a receiver circuit formed by these components, a received signal subjected in a multiplier 304 to a first stage of de-spreading using pseudo-noise PN is subjected in a multiplier 307 to a second stage of de-spreading with an orthogonal code Wi, and decoded as received data addressed to the terminal.

In this embodiment, the received signal subjected in the multiplier 304 to the first stage of de-spreading is inputted to multipliers 313 and 310. The signal inputted to the multiplier 313 is subjected to a second stage of de-spreading with an orthogonal code $W_0$ generated by an orthogonal code generator 306.

The above described orthogonal code $W_0$ corresponds to an orthogonal code ($W_0$) for pilot signal spreading periodically outputted by the base station. By inputting a signal de-spreaded with the above described orthogonal code $W_0$ to an accumulator 314 and accumulating the signal over a predetermined period of time, the pilot signal can be demodulated. The above described pilot signal is squared by a square unit 315. A resultant signal indicating the power of the pilot signal is inputted to a first terminal of a signal-to-noise (S/N) ratio measuring unit 316.

On the other hand, the received signal inputted to the multiplier 310 is subjected to a second stage of de-spreading using the orthogonal code $W_N$ exclusively for the signal-to-noise measurement. The de-spreaded signal is inputted to an accumulator 311 and accumulated therein over a predetermined period of time.

The above described orthogonal code $W_N$ becomes a specific orthogonal code which is not used for modulation of the transmission signal in the base station. As a result of de-spreading process using this orthogonal code, therefore, it is possible to completely remove the signal transmitted from the above described base station and extract the signal corresponding to noise. Therefore, the noise power can be obtained by accumulating the output of the multiplier 310 in the accumulator 311 over a predetermined period of time and squaring the result in a square unit 312.

The above-described noise power is inputted to a second terminal of the signal-to-noise measuring unit 316. By calculating the ratio with respect to the power of the pilot signal described before, a signal indicating the signal-to-noise ratio of the pilot signal is derived.

In the present embodiment, the above described signal-to-noise ratio signal is compared with a reference signal-to-noise ratio in a comparator 330. A power control signal PC indicating the difference from the reference signal-to-noise ratio is thus obtained. This power control signal PC is multiplexed with transmission data in a multiplexer 317, thereafter encoded in an encoder 318, subjected in a multiplier 320 to spread spectrum modulation using pseudo-noise generated by a pseudo-noise generator 319, and then transmitted toward the base station via a radio frequency circuit 321, a circulator 302, and antenna 301.

Figure 3:
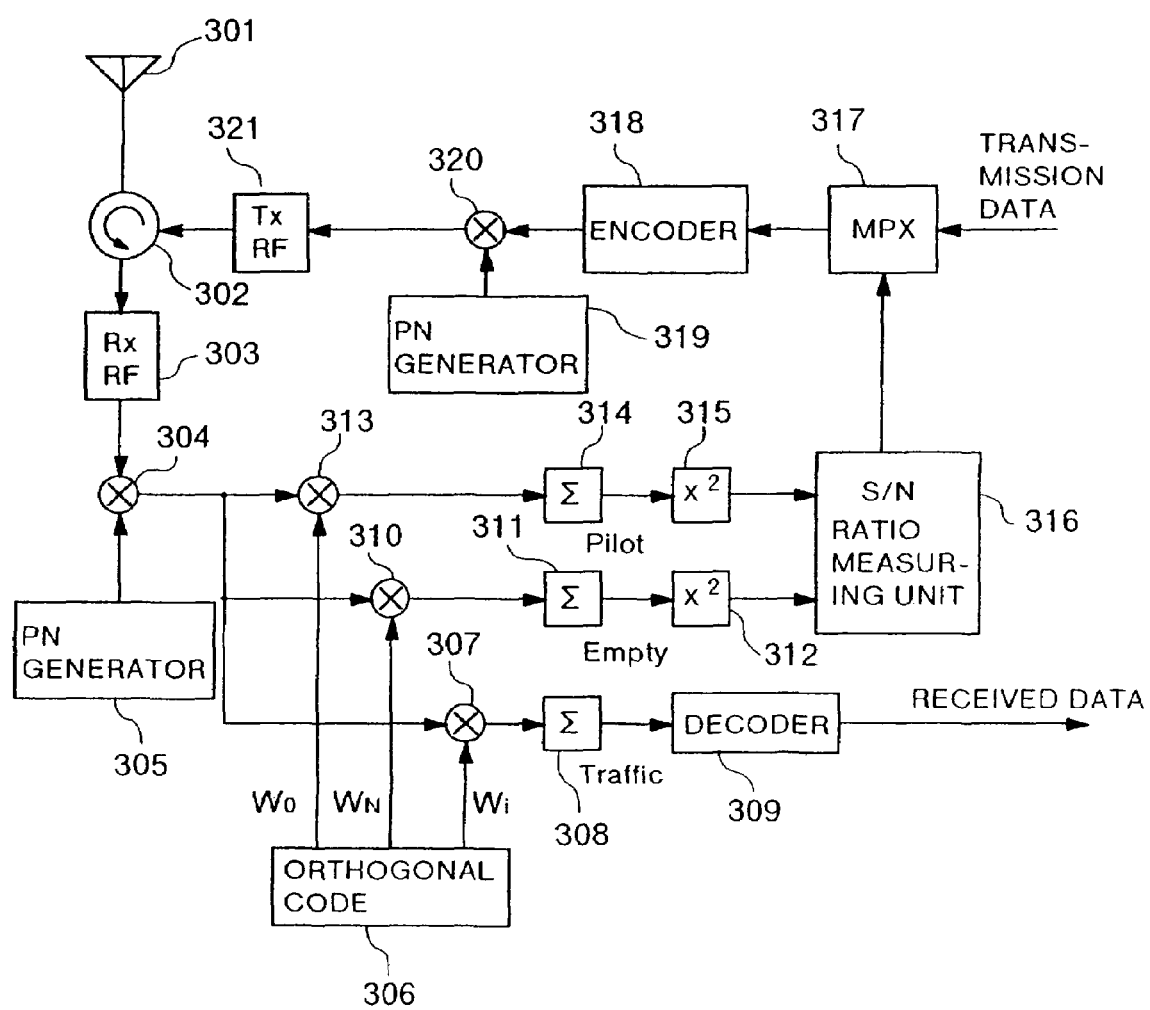
FIG. 3 is a configuration diagram showing a second embodiment of a terminal applied to the communication system of the present invention.

FIG. 3 shows a second embodiment of a terminal.

In this embodiment, the comparator 330 of FIG. 2 is omitted, and signal-to-noise information outputted from a signal-to-noise ratio measuring unit is handled as a power control signal SN as it is, multiplexed in a multiplexer 317 with transmission data, and then transmitted via an encoder 318, a multiplier 320, a radio frequency circuit 321, and a circulator 321.

In the base station 100 shown in FIG. 1, each modem 105-$i$ ($i=1, 2, \ldots, N-1$) splits the received signal supplied from each terminal associated therewith into received data and a power control signal, and supplies the power control signal to a transmission power controller 106.

In case each terminal has the structure of the first embodiment, the power control signal PC is separated. In case each terminal has the structure of the second embodiment, the power control signal SN is separated.

In response to the power control signal PC or SN, the above described transmission power controller 106 generates a signal PW for specifying the transmission power to be supplied to each modem 105-$i$.

Figure 4:
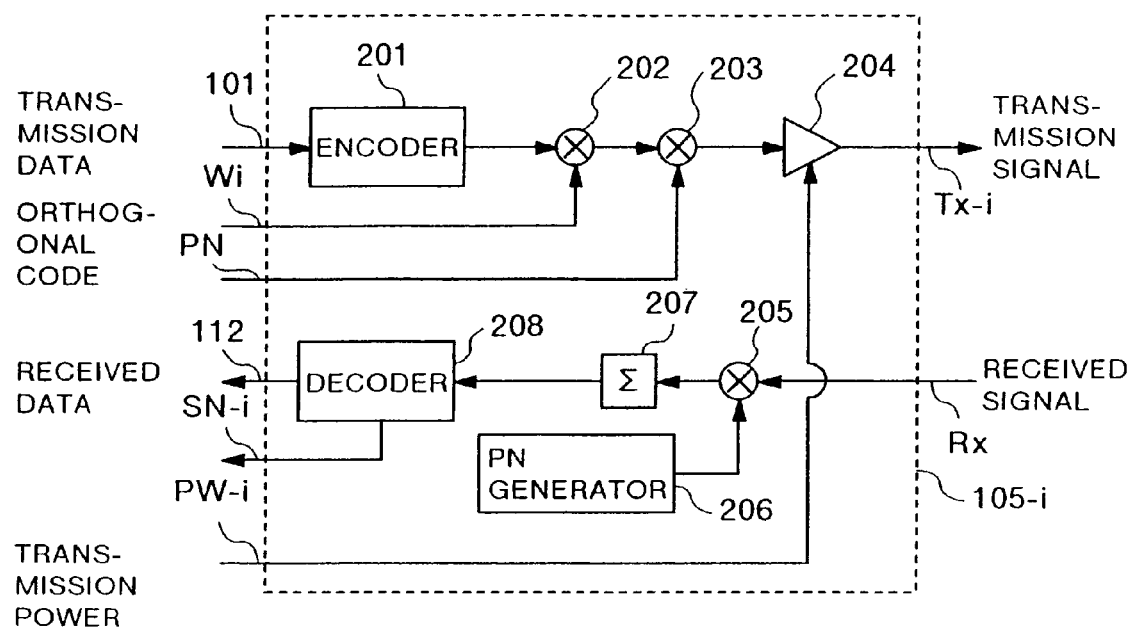
FIG. 4 is a diagram showing details of a modem 105-*i* of the base station.

The configuration of the above described modem 105-$i$ is shown in FIG. 4.

Circuit components 201 to 207 correspond to the circuit components 201 to 207 of the conventional modem shown in FIG. 15.

A received signal Rx supplied from the terminal is de-spreaded in a multiplier 205 by a pseudo-noise signal, accumulated in an accumulator 207 over a predetermined period of time, and thereafter inputted to an error correction decoder 208. In the error correction decoder 208, decoding process for error correction is conducted. From the decoded signal, received data 112 and the power control signal SN-i or PC-i are separated.

In case the terminal has the configuration of the first embodiment, the power control signal PC-i separated in each modem 105-$i$ is inputted to the transmission power controller 106 so that the signal PW-i for specifying the transmission power is generated according to the power control signal PC-i.

Figure 5:
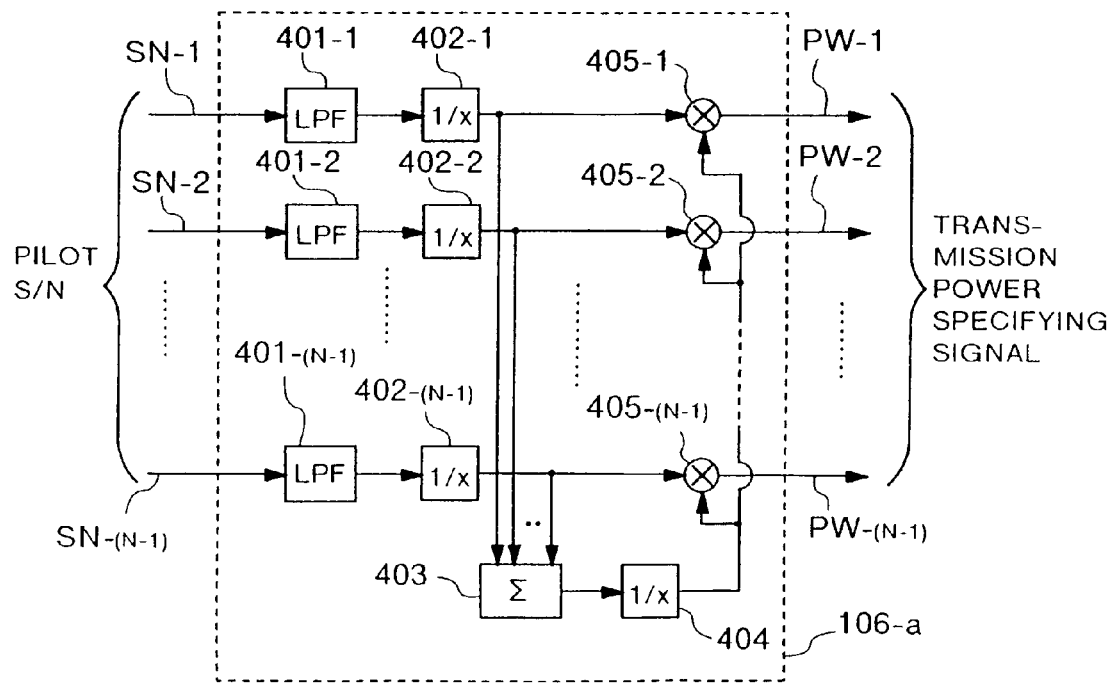
FIG. 5 is a diagram showing a first embodiment of a transmission power controller of the base station.

FIG. 5 shows an example of configuration of the transmission power controller 106 of the case where the terminal has the structure of the second embodiment and the modem 105 outputs the control signal SN-i ($i=1, 2, \ldots, N-1$).

The power control signal SN-i is inputted to a low pass filter 401-$i$ ($i=1, 2, \ldots, N-1$) associated with each terminal. A radio frequency signal varying with a frequency higher than needed is removed therein. Thereafter, the power control signal SN-i is converted to a signal corresponding to an inverse number of the signal-to-noise ratio value in an inversion unit 402-$i$ (i=1, 2, ..., N−1).

Outputs of the above described inversion units 402-$i$ are added up in an adder 403. Thereafter, a resultant sum is subjected to inversion again in an inversion unit 404. The output of the inversion unit 404 is supplied to a multiplier 405-$i$ (i=1, 2, ..., N−1) and multiplied by the output of the inversion unit 402-$i$ (i=1, 2, ..., N−1). A result of this multiplication is outputted as the transmission power specifying signal PW-i (i=1, 2, ..., N−1) of each terminal.

In this case, the signal PW-i for specifying the transmission power represents a weighting function for transmission power. As the signal-to-noise ratio value of a terminal becomes lower, the value of the signal PW-i is determined so as to make the transmission power higher than that of other terminals.

The above described transmission power specifying signal Pw-i is supplied to the modem 105-$i$ associated with it and shown in FIG. 4. In the modem 105-$i$, the transmission power specifying signal PW-i is inputted to an amplifier 204 of a transmission circuit system. As a result, the transmission signal is outputted with power depending upon the state of the signal-to-noise ratio of each terminal.

In the configuration heretofore described, the pilot signal transmitted from the base station and transmission signal (data signal) transmitted from the base station to each terminal have the same frequency band and they are transmitted at the same time point. Therefore, attenuation caused in the received data signal of each terminal according to the distance from the base station is equal to attenuation caused in the pilot signal. Furthermore, noise caused in the pilot signal is equal to that caused in the data signal.

As in the above described embodiment, therefore, each terminal measures the signal-to-noise ratio on the basis of the received power of the pilot signal and noise power extracted at that time by using the orthogonal code for the signal-to-noise ratio measurement and transmits the signal-to-noise ratio as the power control signal (PC or SN). On the basis of the power control signal, the base station controls transmission of the data signal for each terminal with transmission power inversely proportionate to the signal-to-noise ratio. Thereby, the signal-to-noise ratio of received signals in terminals can be made equal.

The pilot signal is not subjected to power control in the base station. As compared with the signal-to-noise ratio calculated from the data signal and the noise signal varied under the influence of power control, therefore, the signal-to-noise ratio calculated from the pilot signal and the noise signal becomes an excellent power control signal.

Figure 6:
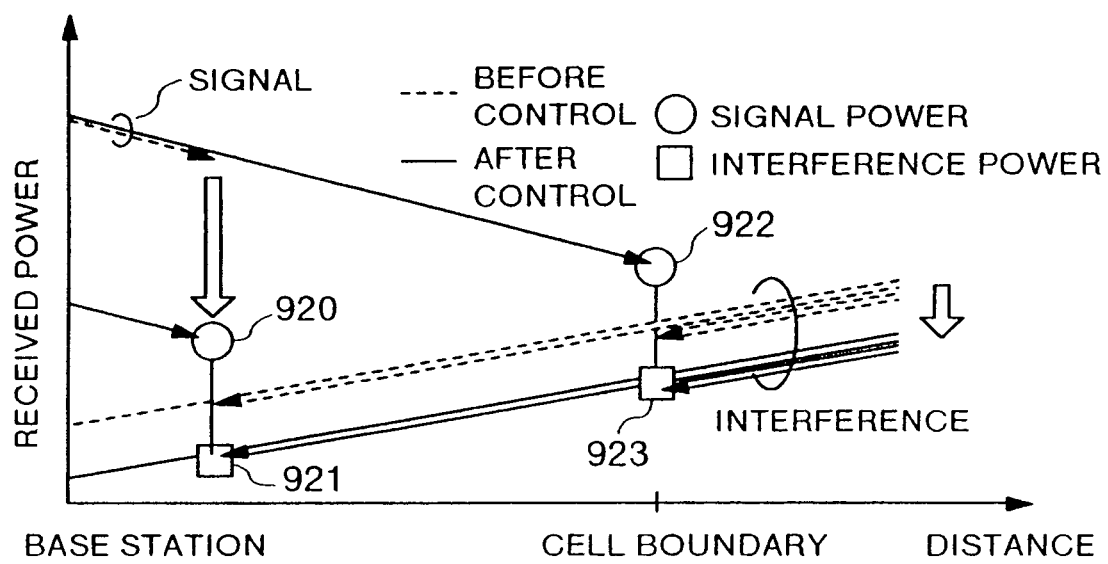
FIG. 6 is a diagram illustrating the relation between a signal supplied from a base station located in a cell in a communication system according to the present invention and interference from other cells.

FIG. 6 shows effects obtained when transmission power control is exercised so as to make the signal-to-noise ratios in terminals equal.

In accordance with the present invention, power control is exercised so as to make the transmission power of a signal directed to a terminal B located near the base station than the transmission power of a signal directed to a terminal A located near the boundary of a cell. Therefore, received power values of the signals at the terminals A and B become as represented by 920 and 922, respectively.

The above described power control is exercised similarly in cells adjacent to each cell as well. Control is exercised in such a direction as to decrease the total transmission power of each base station. In each cell, therefore, power of jamming signals from adjacent cells is decreased. The received power of interference transmitted from base stations of other cells and arriving at the terminal located near the base station is reduced as represented by 921. The received power of interference arriving at the terminal located near the boundary of the cell is reduced as represented by 923.

In a spread spectrum communication system having such a structure that hexagon cells, for example, are repetitively disposed, the effect of this power reduction corresponds to approximately 7.4 dB.

Furthermore, by an amount of reduction in power of interference, the number of terminals capable of communicating simultaneously in each cell (the number of terminals accommodated by the base station) can be increased. The number can be increased to approximately 5.5 times at its maximum that of the conventional technique. Since the above described power control is open loop control, stable control is exercised.

Figure 7:
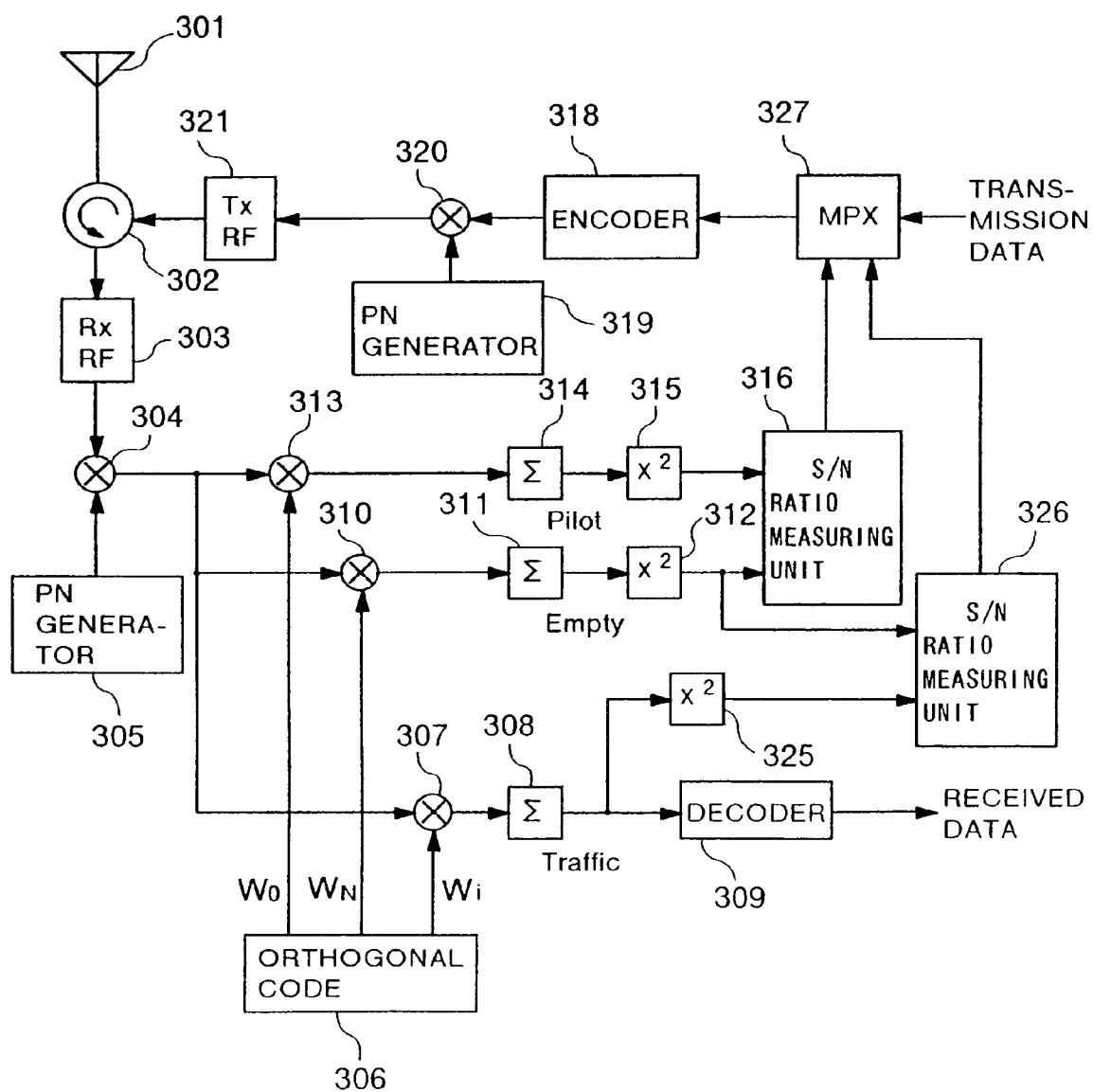
FIG. 7 is a configuration diagram showing a third embodiment of a terminal applied to the communication system of the present invention.

FIG. 7 shows a third embodiment of the terminal.

In this embodiment, a first signal-to-noise ratio measuring unit 316 and a second signal-to-noise ratio measuring unit 326 are combined.

The first signal-to-noise ratio measuring unit 316 derives signal-to-noise information from the pilot signal in the same way as the signal-to-noise measuring unit shown in FIG. 2.

The second signal-to-noise measuring unit 326 derives signal-to-noise information from the data signal addressed to the terminal.

That is to say, the transmission signal addressed to the terminal de-spreaded in a multiplier 307 with an orthogonal code Wi is integrated in an accumulator 308 over a predetermined period of time. The output of the accumulator 308 is inputted to a decoder 309. The output of the accumulator 308 is inputted to a square unit 325 as well to derive power of the received signal. This power of the received signal is supplied to the signal-to-noise ratio measuring unit 326 as a second input.

To a first input of the second signal-to-noise ratio measuring unit 326, power of the noise signal de-spreaded with an orthogonal code W.sub.N and outputted from a square unit 312 is supplied. As a result, the signal-to-noise ratio of the received signal is derived.

Signal-to-noise information of these two kinds is multiplexed in a multiplexer 327 with transmission data and transmitted via an encoder 318, a multiplier 320, a radio frequency circuit 321, a circulator 302, and an antenna 301. Alternatively, the difference with respect to a reference signal-to-noise ratio may be transmitted to the base station as the power control signal PC in the same way as the first embodiment.

Figure 8:
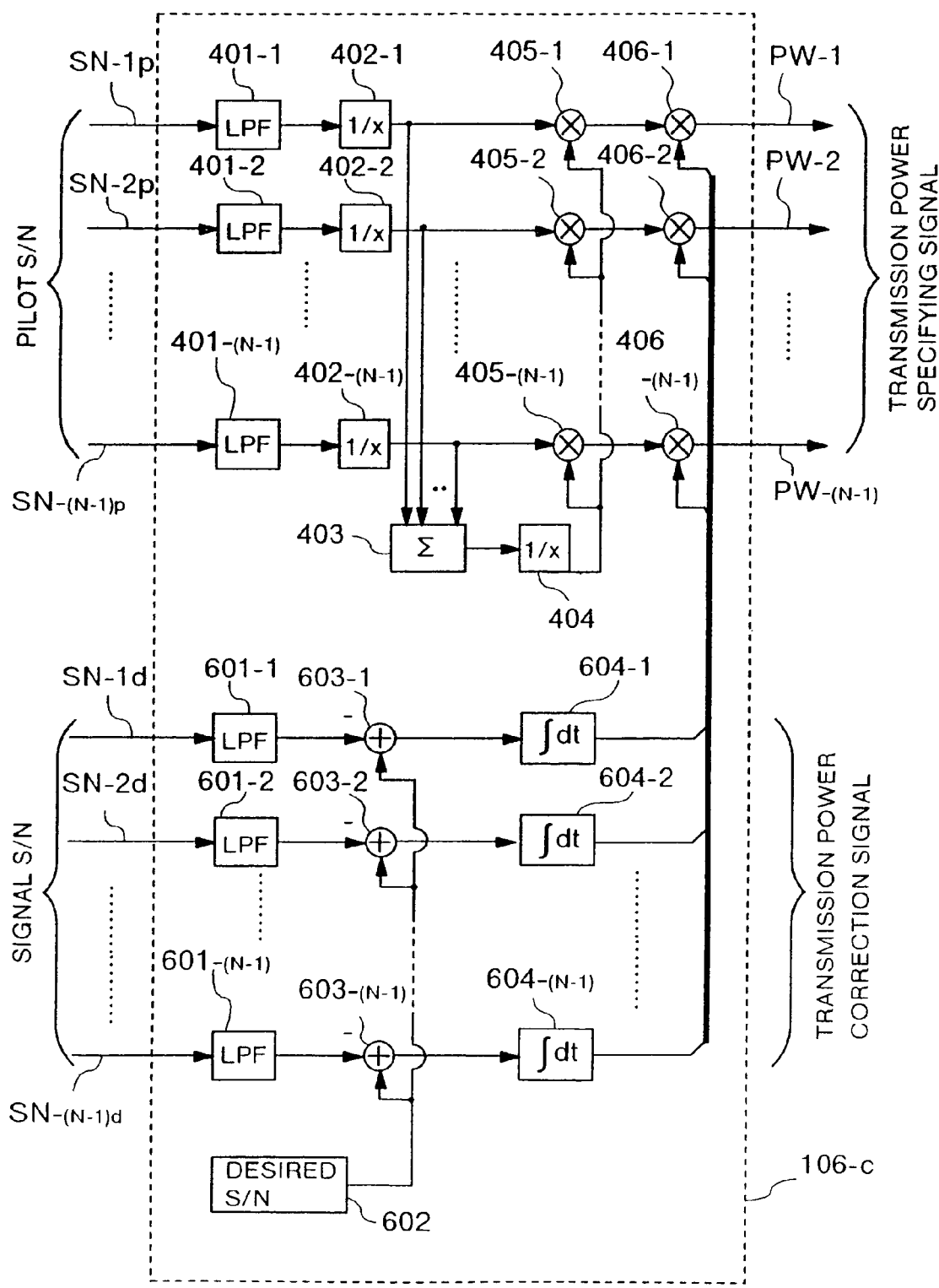
FIG. 8 is a diagram showing a second embodiment of a transmission power controller of the base station.
Figure 9:
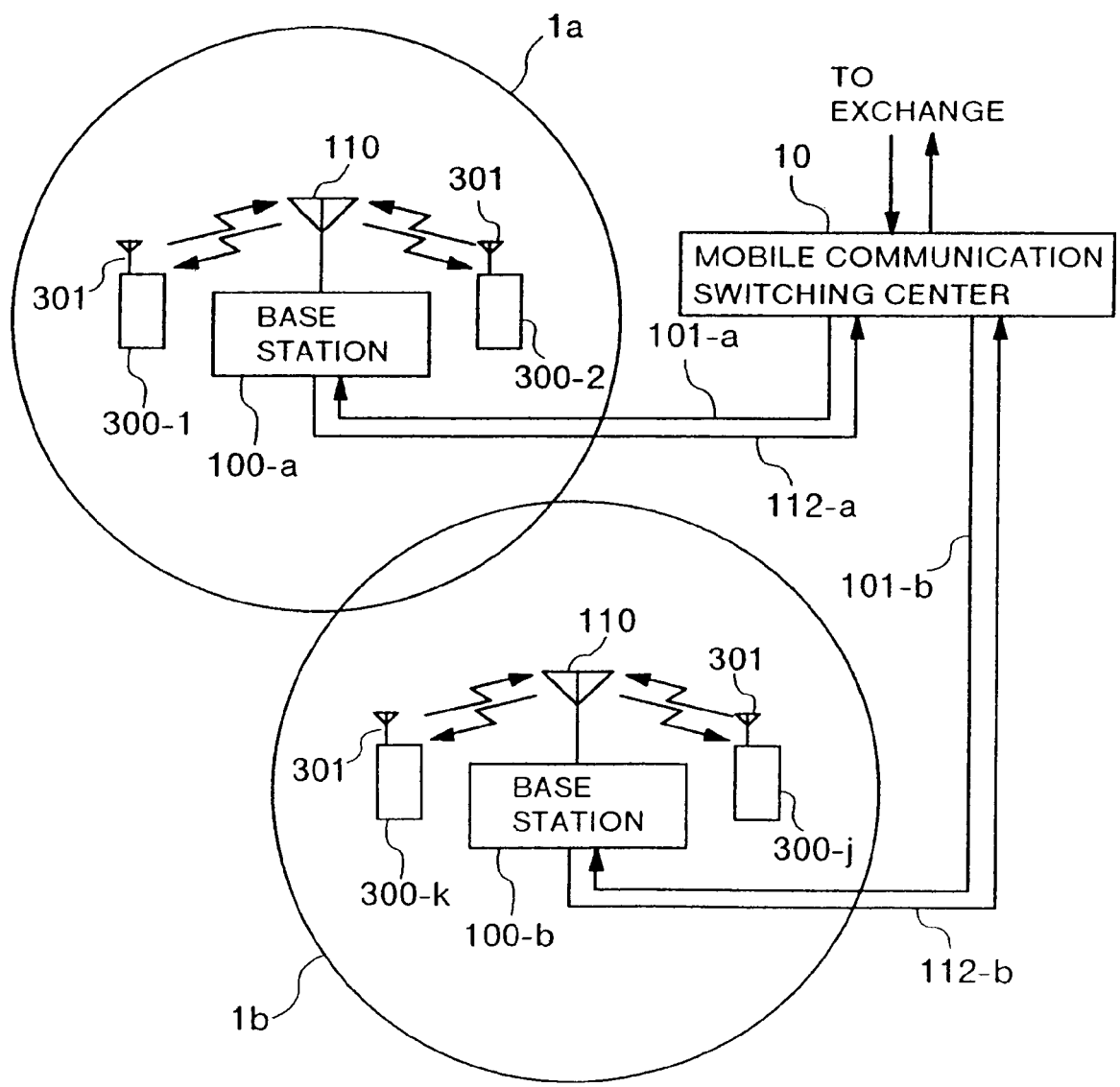
FIG. 9 is a diagram showing an example of entire configuration of a mobile communication system whereto the present invention is applied.
Figure 10:
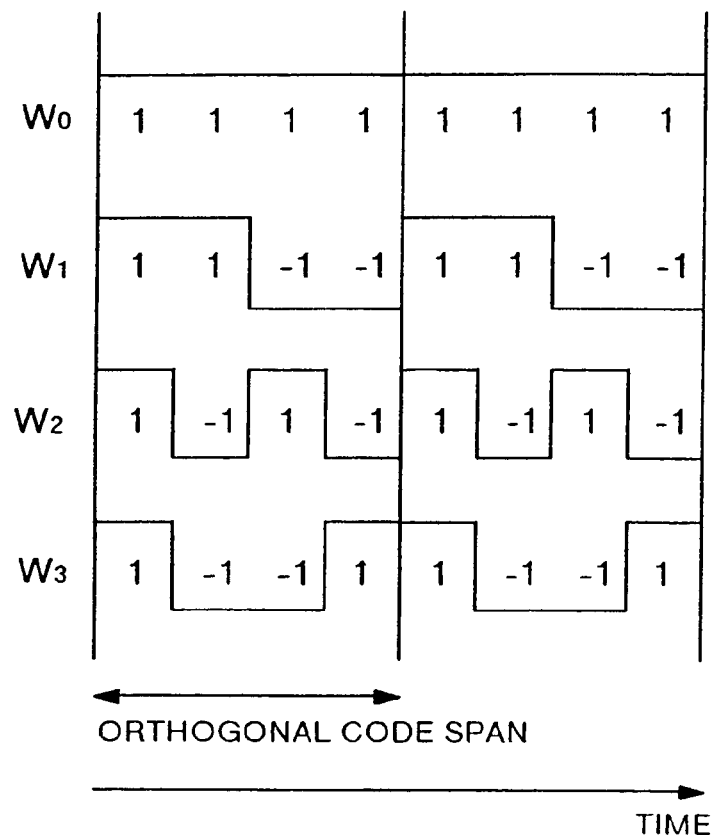
FIG. 10 is a diagram showing an example of orthogonal codes used for spectrum spreading.
Figure 11:
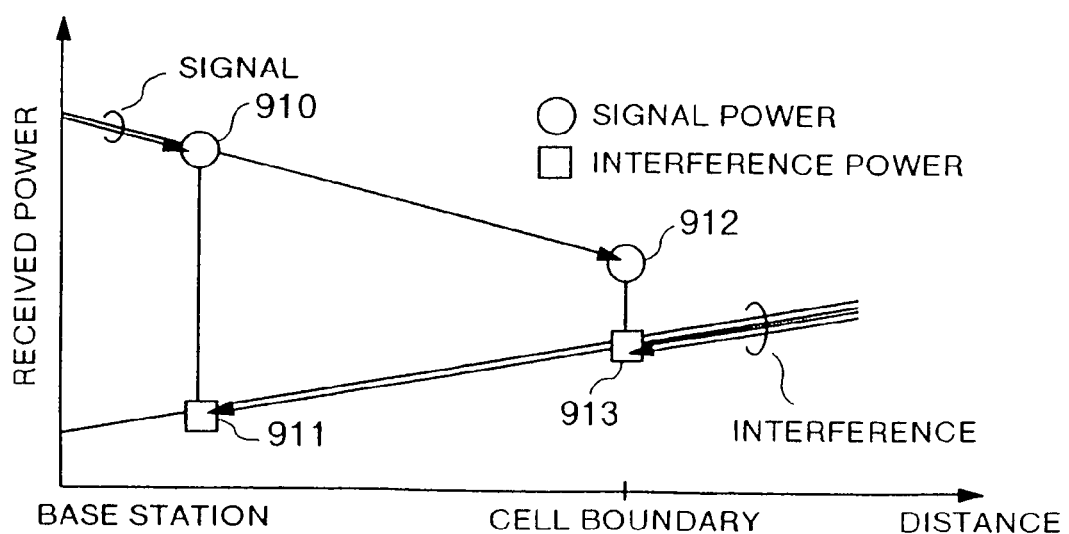
FIG. 11 is a diagram illustrating the relation between a signal supplied from a base station located in a cell in a conventional communication system and interference from another cell.
Figure 12:
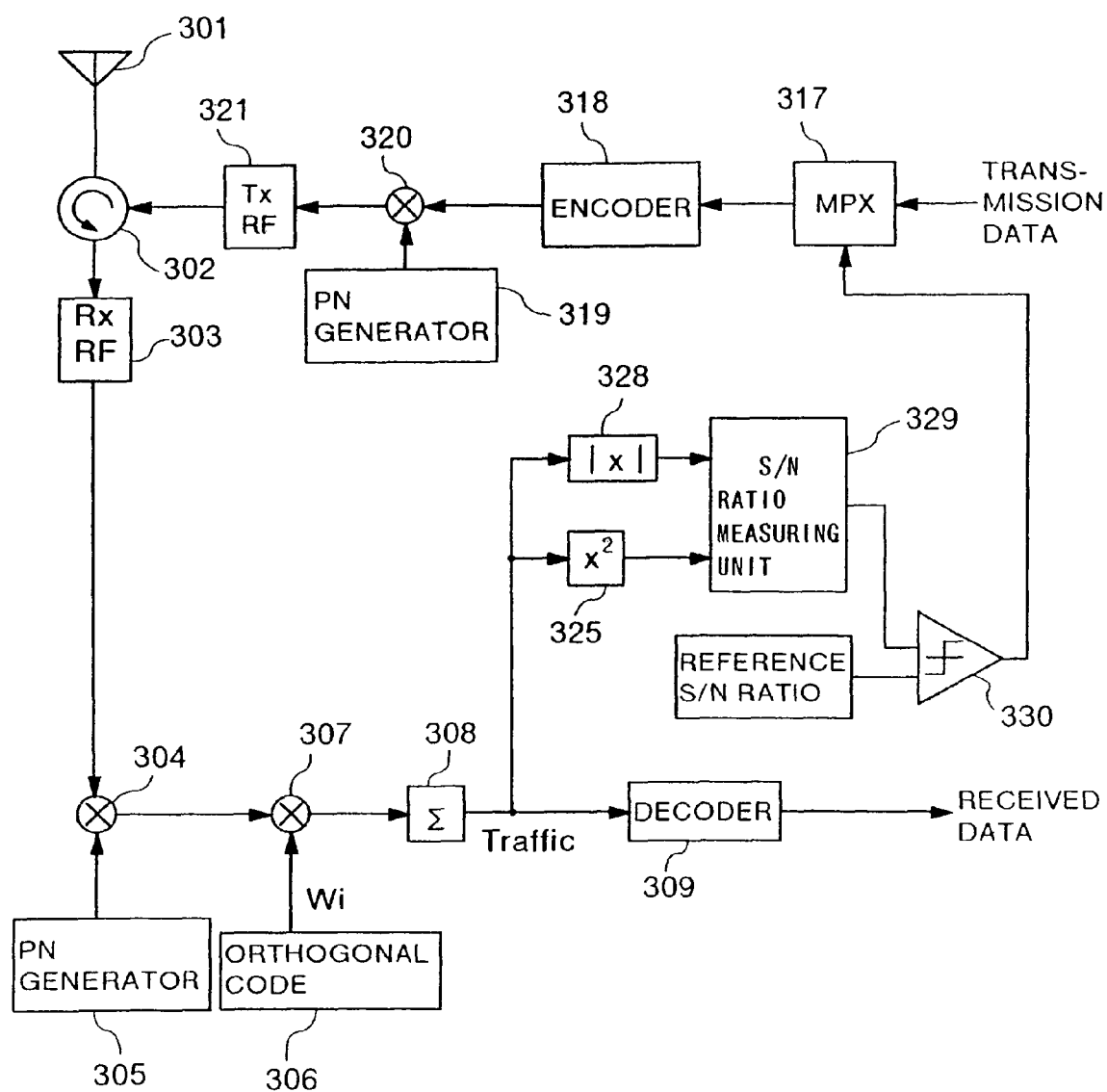
FIG. 12 is a diagram showing an example of configuration of a terminal according to a conventional technique.

FIG. 8 shows the configuration of the transmission power controller 106 in the base station of the case where each terminal has the configuration of the above described second embodiment.

In the base station, each modem 105-$i$ separates and outputs power control signals of two kinds transmitted by the terminal, i.e., the signal-to-noise ratio (SN-ip) of the pilot signal and the signal-to-noise ratio (SN-id) of the received signal.

From the signal-to-noise ratio SN-ip (i=1, 2, ..., N−1) of the pilot signal, a first weighting function of transmission power for each terminal is generated by a circuit configuration similar to that shown in FIG. 5 including circuit components 401-$i$, 402-$i$, 403, 404 and 405-$i$.

On the other hand, from the signal-to-noise ratio SN-id (i=1, 2, ..., N−1) of the received signal, a second weighting function of transmission power for each terminal is generated by a circuit configuration including circuit components 601-$i$, 602, 603-$i$ and 604-$i$. In this circuit, the power control signal SN-id (i=1, 2, ..., N−1) separated by each modem 105$i$ (i=1, 2, ..., N−1) is inputted to a low pass filter 601-$i$ (i=1, 2, ..., N−1). After more radio frequency variation than needed is removed therein, the difference between the power control signal SN-id and a desired signal-to-noise ratio outputted from a comparator $603$-$i$ ($i=1, 2, \ldots, N-1$) is derived. For each terminal, the difference between the actual signal-to-noise ratio and the desired signal-to-noise ratio is integrated by an integrator $604$-$i$.

By making the second weighting function act on the first weighting function as a correction value, the transmission power specifying signal PW-i ($i=1, 2, N-1$) of each terminal is derived. At this time, the time constant of the low pass filter $601$-$i$ is set to a value sufficiently larger than that of the low pass filter $401$-$i$.

In the case of this embodiment, both of open loop control and closed loop control are performed. Even if there is some nonlinearity in the transmission system, the signal-to-noise ratio of each terminal is controlled so as to coincide with the desired signal-to-noise ratio.

According to each of the above described embodiments, there is a possibility that the transmission power for a terminal becomes very small when the terminal is located near the base station and the signal receiving state from the base station is very good. Such a phenomenon can be avoided by setting a threshold indicating the lower limit value of the transmission power and exercising control so as to keep the transmission power from becoming the threshold or less.

What is claimed is:

1. A method for controlling transmission, using spread spectrum communication techniques, of a data signal from a base station to a mobile terminal, the method comprising the steps of:
    transmitting, by the base station, a pilot signal in a given frequency band;
    receiving, by the mobile terminal, the transmitted pilot signal and generating a response signal in response to receiving the transmitted pilot signal, the response signal indicating a reception condition of said pilot signal at said mobile terminal; and
    receiving, by the base station, said response signal from the mobile terminal and controlling, within a transmission power range, a transmission power of said data signal transmitted to said mobile terminal in said frequency band in response to said received response signal,
    wherein the pilot signal is transmitted without transmission power control.

2. The method as set forth in claim 1, wherein both open loop control and closed loop power control are performed.

3. The method as set forth in claim 1, wherein said mobile terminal determines a reception condition of said pilot signal and a reception condition of said data signal, and
    wherein the base station controls a transmission power of said data signal transmitted to said mobile terminal in response to said reception condition of said pilot signal and said data signal.

4. The method as set forth in claim 3, wherein said response signal transmitted by said mobile terminal transmits a value of a signal-to-noise ratio of the received pilot signal and a signal-to-noise ratio of the received data signal.

5. A base station for transmitting signals to a plurality of mobile terminals using spread spectrum communication techniques, said base station comprising:
    circuit components for transmitting a pilot signal;
    circuit components for receiving from at least one of said plurality of mobile terminals a control signal representative of a reception condition of said pilot signal at said at least one mobile terminal; and
    circuit components for analyzing said control signal received from said at least one mobile terminal and for controlling, within a transmission power range, the transmission power of a data signal transmitted to said at least one mobile terminal as a result of said analysis,
    wherein the pilot signal is transmitted without transmission power control.

6. The base station as set forth in claim 5, wherein said circuit components for receiving said signal representative of a reception condition of said pilot signal at said at least one mobile terminal are adapted to receive said control signal from said at least one mobile station indicating a reception condition of both said pilot signal and said data signal at said at least one mobile terminal.

7. A base station for transmitting signals to a plurality of mobile terminals using spread spectrum communication techniques, said base station comprising:
    circuit components for transmitting a pilot signal;
    circuit components for receiving from at least one of said plurality of mobile terminals a control signal representative of a reception condition of said pilot signal at said at least one mobile terminal; and
    circuit components for analyzing said control signal received from said at least one mobile terminal and for controlling, within a transmission power range, the transmission power of a data signal transmitted to said at least one mobile terminal as a result of said analysis,
    wherein said circuit components for receiving said signal representative of a reception condition of said pilot signal at said at least one mobile terminal are adapted to receive said control signal from said at least one mobile station indicating a reception condition of both said pilot signal and said data signal at said at least one mobile terminal, and
    wherein said data signal is transmitted to said at least one mobile terminal at a power inversely proportional to a signal-to-noise ratio being received at said base station as said control signal.

* * * * *